(12) United States Patent
Yang

(10) Patent No.: US 7,557,533 B2
(45) Date of Patent: Jul. 7, 2009

(54) NICKEL METAL HYDRIDE/NICKELCADMIUM SECONDARY BATTERY CHARGER FOR AUTOMOBILES

(76) Inventor: Fu-I Yang, 5th Floor, No. 101, Hsin Pu 8th Street, Taoyuan City (TW)

( * ) Notice: Subject to any disclaimer, the term of this patent is extended or adjusted under 35 U.S.C. 154(b) by 284 days.

(21) Appl. No.: 11/504,010

(22) Filed: Aug. 15, 2006

(65) Prior Publication Data
US 2006/0273760 A1 Dec. 7, 2006

Related U.S. Application Data

(63) Continuation-in-part of application No. 10/718,673, filed on Nov. 24, 2003, now abandoned.

(51) Int. Cl.
*H02J 7/00* (2006.01)
*H02B 1/00* (2006.01)
(52) U.S. Cl. .................. 320/107; 320/115; 320/109; 361/600
(58) Field of Classification Search .......... 320/107, 320/115; 361/600
See application file for complete search history.

(56) References Cited

U.S. PATENT DOCUMENTS 5,977,747 A * 11/1999 Huang ................. 320/115

* cited by examiner

*Primary Examiner*—Adolf Berhane
*Assistant Examiner*—Yalkew Fantu
(74) *Attorney, Agent, or Firm*—Rosenberg, Klein & Lee

(57) ABSTRACT

A nickel metal hydride/nickel cadmium secondary battery charger includes: a charging base having a lower casing and a cover; a charge control circuit board installed in a containing space of the lower casing; a power supply plug with its external end corresponding to the cylindrical shape of a cigarette lighter in a car for connecting a power supply and conducing electric power, and its internal end being a protruding ear and having a protruding axle pivotally coupled to both sides of the protruding ear, and a conducting wire passed through the interior of one of the protruding axles and connected to a power supply input terminal of the charge control circuit board. The power supply plug uses two protruding axles of the protruding ear as an axis to be rotated and folded from 0° to 180°, so that the protruding axles is extended in front of the charging base or folded in the opposite direction into the battery compartment to facilitate its carrying and reduce its storage space.

5 Claims, 6 Drawing Sheets

NICKEL METAL HYDRIDE/NICKEL CADMIUM SECONDARY BATTERY CHARGER FOR AUTOMOBILES

This patent application is a continuation-in-part of Ser. No. 10/718,673, filed on 24 Nov. 2003 now abandoned.

BACKGROUND OF THE INVENTION

1. Field of the Invention

The invention relates to a nickel metal hydride/nickel cadmium secondary battery charger, and more particularly to a battery charger structure that allows an electric plug to be rotated and folded within 180 degrees and stored in the battery charger.

2. Description of the Related Art

As science and technology advance, electronic products including digital cameras, mobile phones, Game Boy and PDA become popular, and all of these 3C electronic products require dry cells for supplying electric power.

However, a dry cell can be divided into two types: a primary dry cell and a secondary dry cell, wherein the primary dry cell will be discarded after the power is exhausted, and thus a primary dry cell not only increases a user's cost, but also causes problems to environmental protection. Therefore, the secondary dry cell that can be recharged become a mainstream, but the major issue of using a secondary dry cell for the 3C products resides on finding a place outdoors to charge the dry cells after the electric power of the dry cells is exhausted.

Although there are many chargers available for charging a battery in a car by inserting a power supply plug with a conductive connecting cable into a cigarette lighter socket as disclosed in U.S. Pat. No. 5,839,919 and US2003/0062873A1 to overcome the problem of charging a battery outdoors, the foregoing two patented inventions disclosed ways of charging the battery of a mobile phone, but they cannot charge secondary dry cells. Further, U.S. Pat. No. 5,686,811 disclosed a way of charging secondary dry cells, but it comes with a large volume that occupies too much space, and its conductive connecting cable cannot be connected to the cigarette lighter socket in a car.

Therefore, finding a way of improving the battery charger and charging a battery conveniently in a car without occupying much space to facilitate its carrying demand immediate attentions and feasible solutions.

SUMMARY OF THE INVENTION

Therefore, it is a primary object of the present invention to provide a nickel metal hydride/nickel cadmium secondary battery charger capable of charging the nickel metal hydride/nickel cadmium battery directly in a car, so as to provide a convenient way of charging the batteries of the 3C products.

Another object of the present invention is to provide a nickel metal hydride/nickel cadmium secondary battery charger, wherein its charging base is integrally coupled to the power supply plug, and the power supply plug can be turned within 180 degrees, so as to facilitate its carrying, and users can adjust its angle if needed. Furthermore, such arrangement can reduce the storage space.

In order to achieve the above-mentioned objects of the invention, a nickel metal hydride/nickel cadmium secondary battery charger includes:

a) a charging base, comprised of a lower casing and a cover, wherein the lower casing has a containing space, and a front section of the containing space has a U-shape retaining base, and the cover has a battery compartment, and both front and rear walls of the battery compartment have front and rear hollow portions respectively, and a central position of a front edge of the cover has a pivotal groove for connecting a front wall of the battery compartment to the exterior;

b) a charge control circuit board, installed in the containing space of the lower casing, and having a first set of reeds disposed at its front end and a second set of reeds disposed at its rear end, wherein the first set of reeds is protruded from the front hollow portion of the battery compartment, and the second set of reeds is protruded from the rear hollow portion; and c) a power supply plug, corresponding to a cylindrical shape of a cigarette lighter socket in a car, for inserting and connecting to a power supply, and its internal end forming a protruding ear, and a protruding axle being pivotally coupled on both sides of the protruding ear, and one of the protruding axles being provided for passing a conducting wire and connecting a power supply input terminal of the charge control circuit board, and the two protruding axles being disposed across a U-shape retaining base of the lower casing, and the protruding ear being disposed in a pivotal connecting groove of the cover, such that the power supply plug uses the two protruding axles of the protruding ear as an axis to be turned from 0 degree to 180 degrees, and the power supply plug is protruded from the front of the charging base or folded in an opposite direction into the battery compartment.

DETAILED DESCRIPTION OF THE PREFERRED EMBODIMENT

Figure 2:
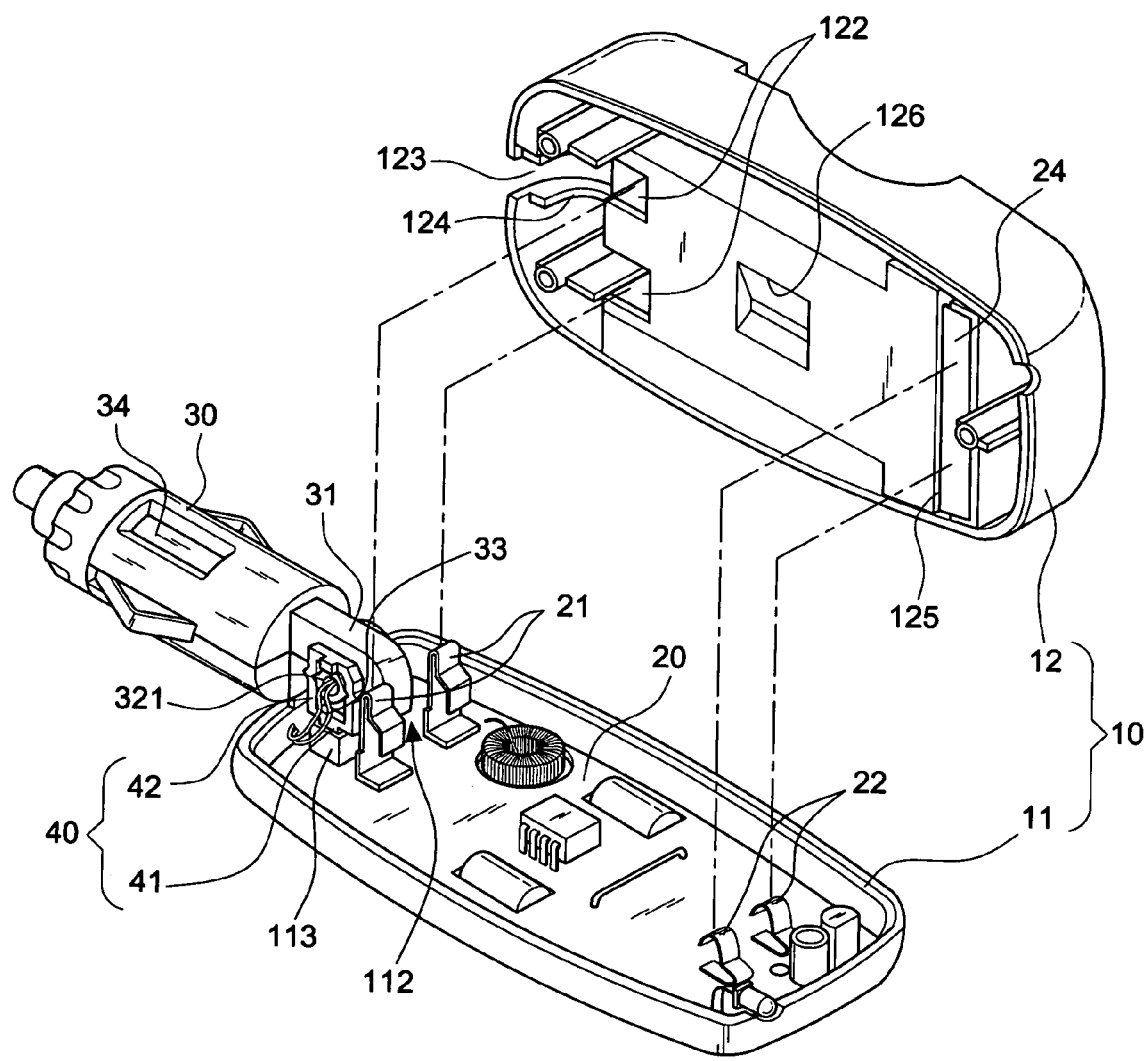
FIG. 2 is an exploded view of a cover and a lower casing of the present invention.
Figure 5:
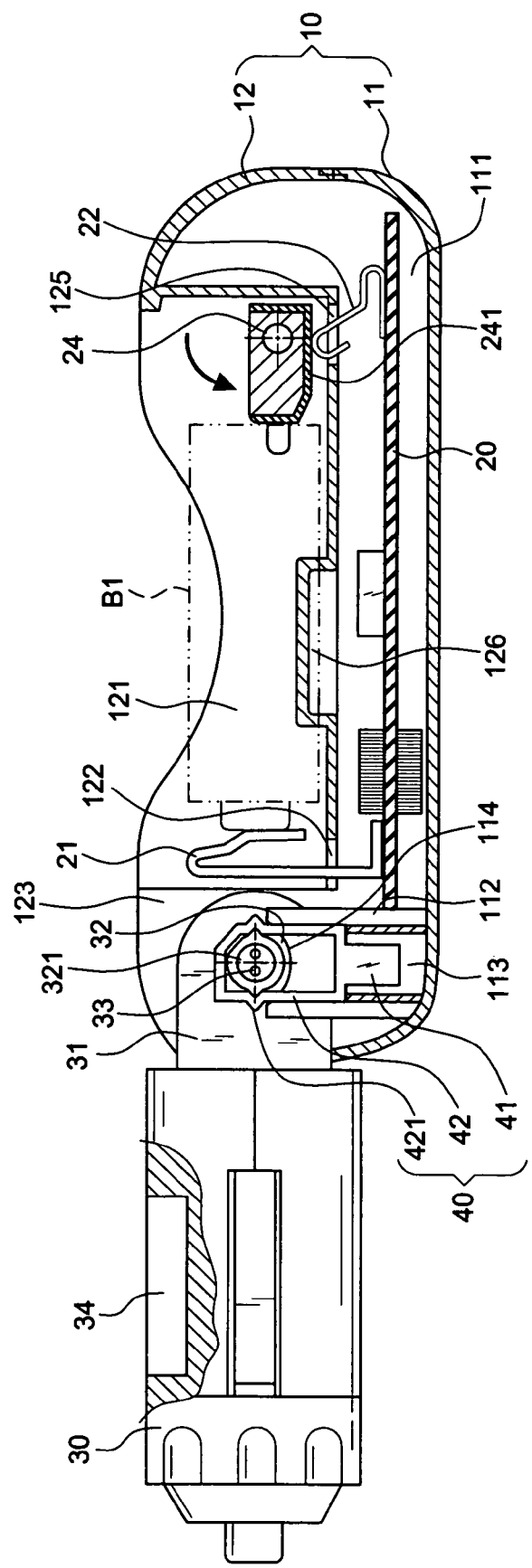
FIG. 5 is a schematic view of charging an AAA size battery (B1) in accordance with the present invention.
Figure 6:
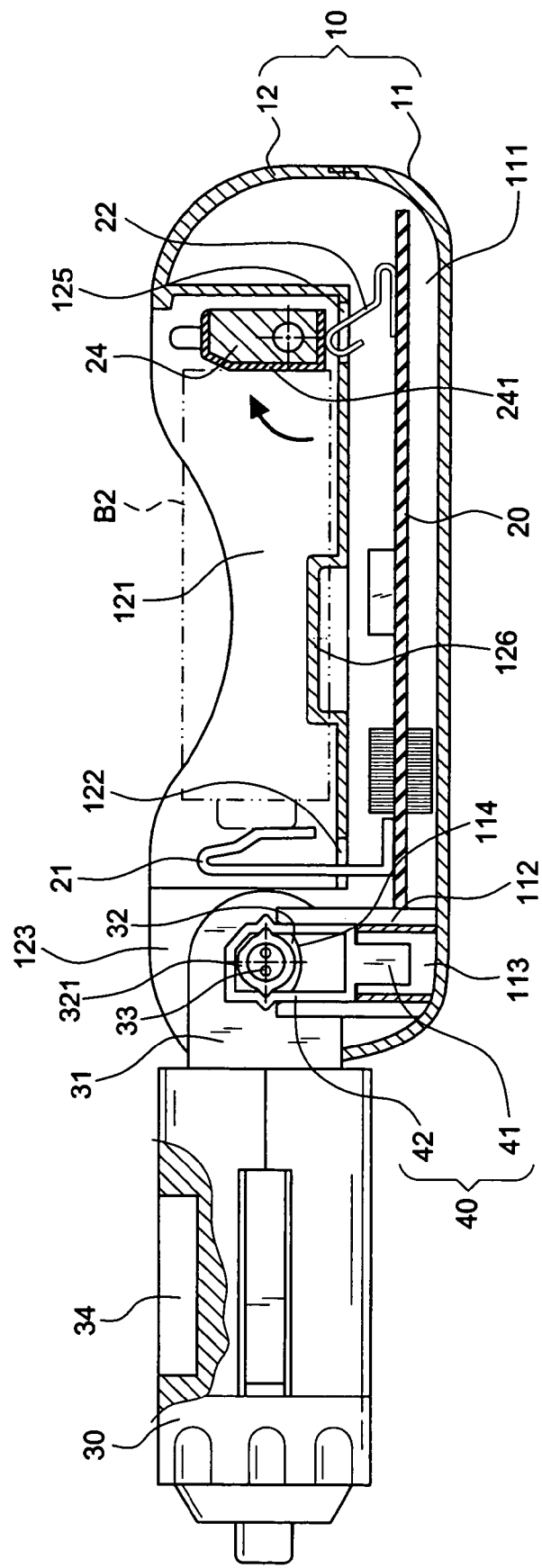
FIG. 6 is a schematic view of charging a AA size battery (B2) in accordance with the present invention.

Referring to FIGS. 1 through 5, a preferred embodiment of the present invention includes the following elements:

A charging base 10 is comprised of a lower casing 11 and a cover 12, wherein the lower casing 11 has a containing space 111, and the front section of the containing space 111 has a U-shape retaining base 112, and the cover 12 has a battery compartment 121, and the front wall of the battery compartment 121 has a front hollow portion 122, and the bottom of the rear wall of the battery compartment 121 has a rear hollow portion 125 as shown in FIG. 2. Further, the central position of the front edge of the cover 12 has a pivotal connecting groove 123 penetrating from the front wall of the battery compartment 121 to the exterior;

A charge control circuit board 20 is installed in the containing space 111 of the lower casing 11 for supplying electric power to the battery compartment 121 for a battery charge, and its front end has a first set of reeds 21, and its rear end has a corresponding second set of reeds 22, wherein the first set of reeds 21 is protruded from the front hollow portion 122 of the battery compartment 121, and the second set of reeds 23 is protruded from the rear hollow portion 125, such that the front and rear walls of the battery compartment 121 separately have a contact terminal for conducting and charging the battery. In this embodiment, an adjusting body 24 is disposed at a position including but not limited to the rear hollow portion 125 and capable of turning within 90 degrees as shown in FIG. 5, and a surface of the adjusting body 24 has a conducting plate 241 situated at a horizontal position with respect to the adjusting body 24 or situated at a perpendicular position as shown in FIG. 6 to maintain its contact with the second set of reeds 22 for an electric conduction all the time. The length of the battery compartment 121 for containing a battery can be changed by turning the adjusting body 24. In FIG. 5, an AAA size battery B1 is installed in the battery compartment 121 for charging the battery. In FIG. 6, the adjusting body 24 is disposed vertically for adjusting the battery compartment 121 to install an AA size battery B2, so as to achieve the same purpose of charging an AA size battery and an AAA size battery.

Figure 1:
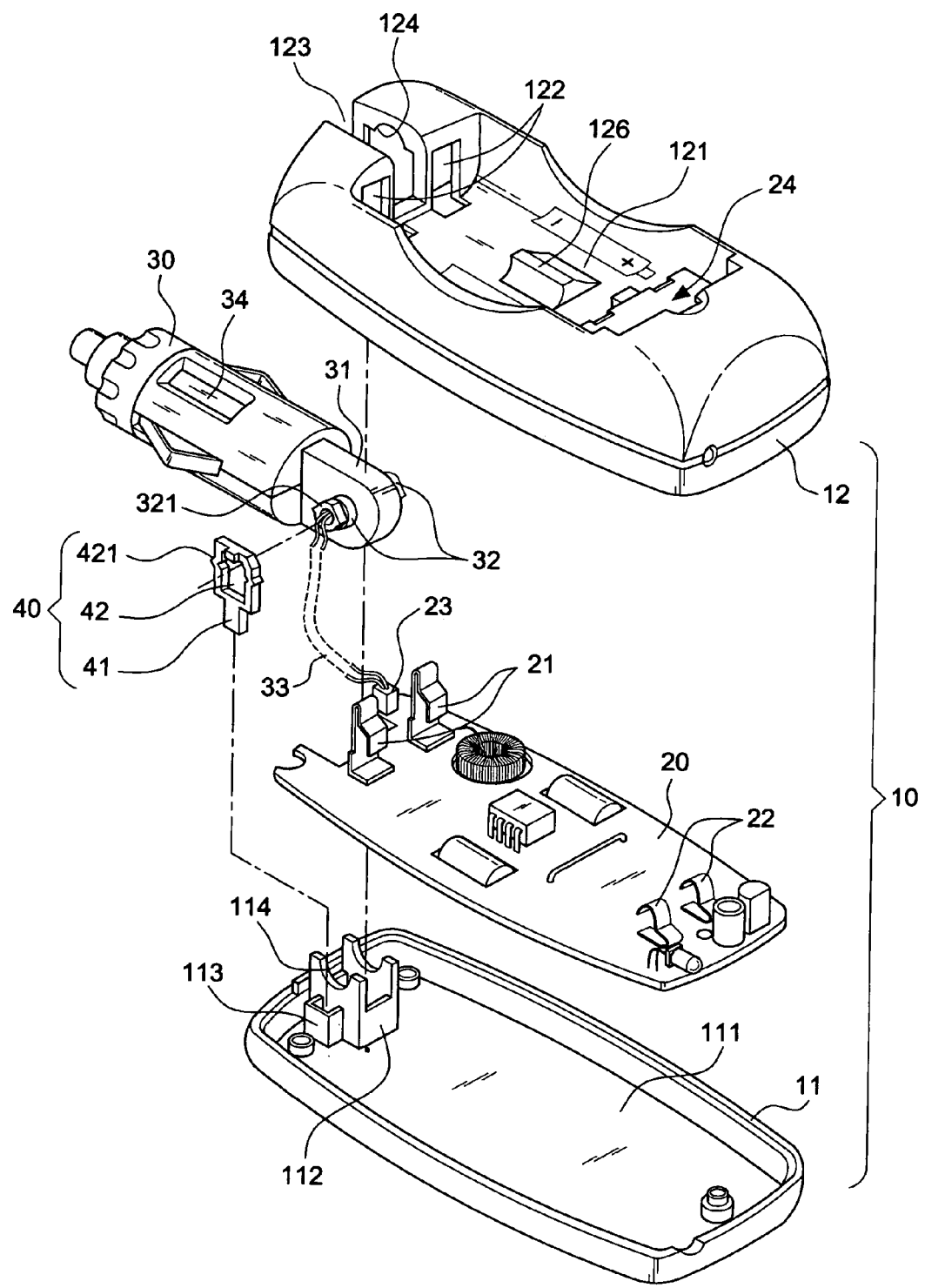
FIG. 1 is an exploded view of the present invention.
Figure 3:
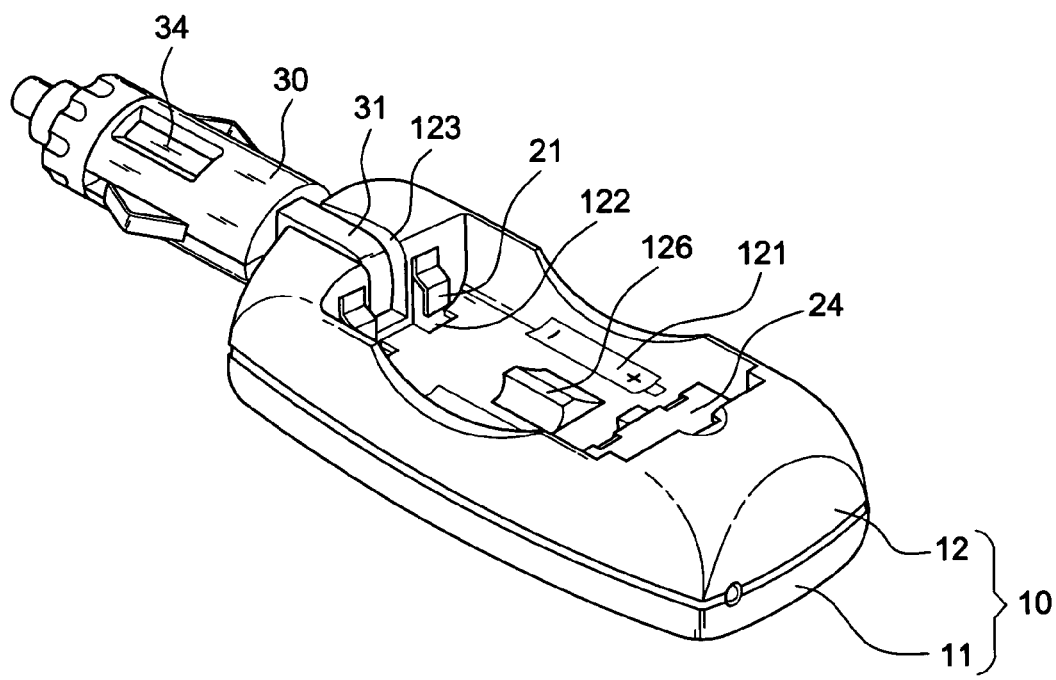
FIG. 3 is a perspective view of a preferred embodiment of the invention, when it is spread open.
Figure 4:
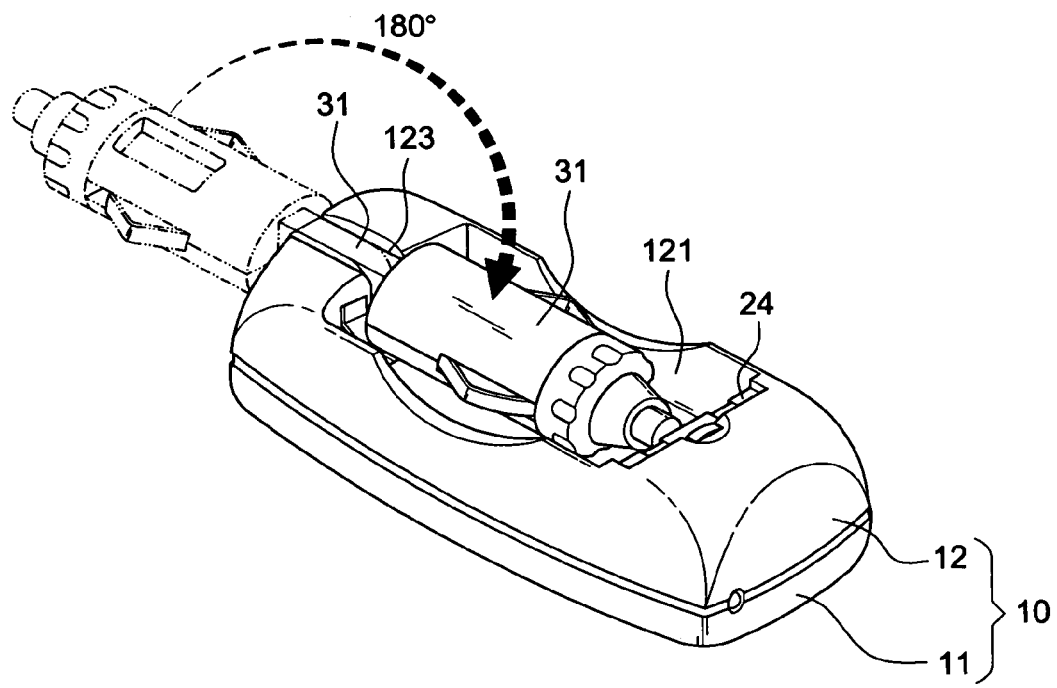
FIG. 4 is a perspective view of a preferred embodiment of the invention, when it is folded.

In FIGS. 1 and 2, the characteristics of the invention include the design of a foldable power supply plug 30 that can be folded within 180 degrees. Referring to FIG. 4 for the power supply plug 30 folded skillfully into the battery compartment 121, the battery charger does not occupy much space to facilitate its carrying and storage. An external end of the power supply plug 30 corresponds to the cylindrical shape of a cigarette lighter socket for connecting and conducting the electric power of the power supply. Since the shape and size of the power supply plug 30 and the internal conducting components are prior arts, they will not be described here. The present invention is characterized in that an internal end of the power supply plug 30 is formed into a protruding ear 31, and both sides of the protruding ear 31 separately have a protruding axle 32 for a pivotal rotation, and one of the protruding axles 32 is provided for passing an internal conducting wire 33 to connect the power supply input terminal 23 of the charge control circuit board 20, and the two protruding axles 32 are disposed across a U-shape retaining base 112 of the lower casing 11. In this embodiment, the top of the U-shape retaining base 112 has a downwardly concave arc 114, and the pivotal connecting groove 123 of the cover 12 has a corresponding downwardly concave arc 124 as shown in FIG. 2. With the upwardly and downwardly concave arcs, the two protruding axles 32 of the power supply plug 30 can be received in place. In other words, the protruding ear 31 is pivotally coupled into the pivotal connecting groove 123 of the cover 12, so as to use the two protruding axles 32 as an axis for the turning from 0 degree to 180 degrees as shown in FIGS. 3 and 4 and allow the protruding axles 32 to be extended in the front of the charging base 10 for the insertion and connection, or folded in the opposite direction into the battery compartment 121 to facilitate its easy carrying and reduce its storage space.

Figure 7:
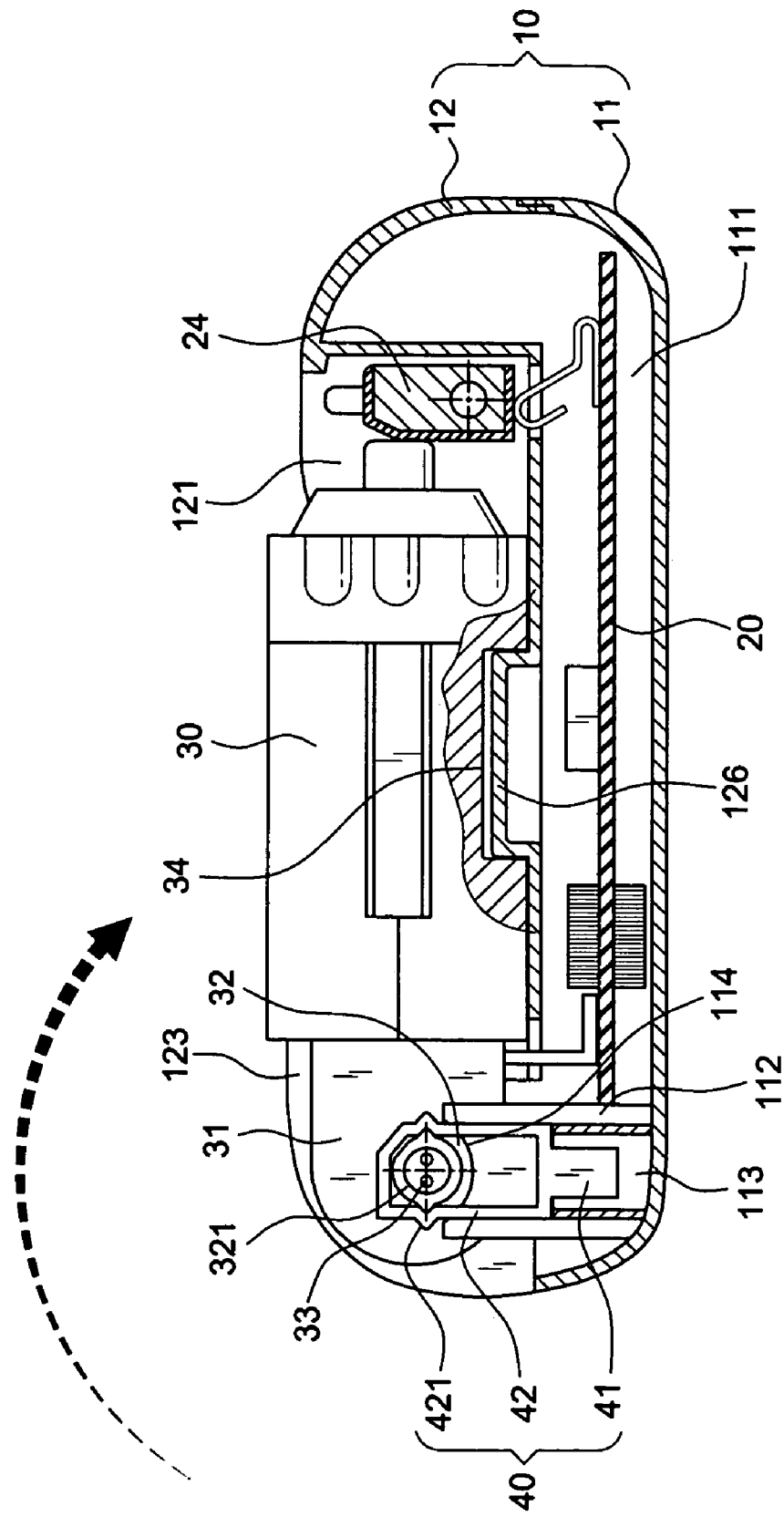
FIG. 7 is a schematic view of a preferred embodiment of the invention, when it is folded.

The power supply plug 30 further includes a non-circular positioning member 321 disposed at an external side of one of the protruding axles 32 and provided for a frame portion 42 of a positioning frame 40 to be sheathed thereon, and the bottom of the positioning frame 40 has an inserting body 41 to be inserted into a latch groove 113 of the lower casing 11. In FIGS. 5 and 7, the frame portion 42 corresponds to the shape of the positioning member 321, and a latch body 421 such as a concave bent portion is formed at front and rear edges of the frame for latching and positioning the protrusion of the positioning member 321. Therefore, the power supply plug 30 can be fixed by the positioning frame 40 regardless of being protruded in front of the charging base 10 or folded in the battery compartment 121. However, the frame portion 42 is elastic, and thus such arrangement will not affect the rotation of the two protruding axles 32 of the power supply plug 30 because the frame portion 42 simply applies an elastic force to the positioning member 321 on the external side of the protruding axle 32.

The power supply plug 30 further includes a recess 34 disposed at the top of the power supply plug 30, and a protrusion 126 disposed at a position corresponding to the recess 24 of the battery compartment 121 after the power supply plug 30 is folded, and the protrusion 126 is embedded and engaged into the recess 34 as shown in FIG. 7.

In summation of the description above, the present invention can charge a nickel metal hydride/nickel cadmium battery directly in a car, and the power supply plug can be turned within 180 degrees and folded into the battery compartment 121. When the battery charger is inserted into a cigarette lighter socket of a car, the charging base 10 can be turned to an appropriate angle to fit the space in the car, so as to improve the prior art and avoid hindering the driving or occupying too much space in a car.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What claimed is:

1. A nickel metal hydride/nickel cadmium secondary battery charger, comprising:
   a) a charging base including a lower casing and a cover, wherein the lower casing has a containing space, and a front section of the containing space has a U-shape retaining base, and the cover has a recessed space defining a battery compartment, and both front and rear walls of the battery compartment have front and rear hollow portions respectively, and a central position of a front edge of the cover has a pivotal groove formed through a front wall of the battery compartment to an exterior;
   b) a charge control circuit board installed in the containing space of the lower casing, and having a first set of conductive reeds disposed at its front end and a second set of conductive reeds disposed at its rear end, wherein the first set of reeds is protruded from the front hollow portion of the battery compartment into the recessed space, and the second set of reeds is protruded from the rear hollow portion into the recessed space, for respective electrical coupling to secondary batteries disposed in the battery compartment; and
   c) a power supply plug corresponding to a cylindrical shape of a cigarette lighter socket in a car, for inserting a distal end thereof into a cigarette lighter socket for connecting to a power supply, and a proximal end forming a protruding ear, an axle extending from each of opposing sides of the protruding ear being pivotally coupled to the U-shaped retaining base of the lower casing, and one of the axles being provided for passing a conducting wire and connecting a power supply input terminal of the charge control circuit board, and the protruding ear being disposed in the pivotal groove and the two protruding axles of the protruding ear forming a rotational axis of the power supply plug, the power supply plug being pivotable about the axis through 180 degrees, the power supply plug thereby being pivotable from a position protruding from a front of the charging base to a storage position disposed in the recessed space defining the battery compartment.

2. The nickel metal hydride/nickel cadmium secondary battery charger as recited in claim 1, wherein the U-shape retaining base of the lower casing has a downwardly concave arc formed on a top thereof and both sides of the pivotal groove respectively have a concave arc so as to affix the protruding axle of the power supply plug therebetween.

3. The nickel metal hydride/nickel cadmium secondary battery charger as recited in claim 1, wherein the power supply plug includes a non-circular positioning member, and an external surface of one of the protruding axles is provided for installing a frame portion of a positioning frame in correspondence therewith for releasably fixing positions of the power supply plug, and a bottom of the positioning frame has an inserting body to be inserted into a latch groove formed in the lower casing, and the frame portion corresponds to a shape of the positioning member, and a latch body is formed at an edge of the front and rear frames.

4. The nickel metal hydride/nickel cadmium secondary battery charger as recited in claim 1, wherein the rear hollow portion of the charging base includes an adjusting body that is rotatable through 90° for adapting the battery compartment for different sized secondary batteries and a surface of the adjusting body includes a conducting plate disposed on orthogonal sides of the adjusting body and being contact with the second set of conductive reeds for an electric conduction thereto.

5. The nickel metal hydride/nickel cadmium secondary battery charger as recited in claim 1, wherein the power supply plug further includes a recess disposed at the top thereof, and a protrusion disposed at a position corresponding to the recessed space defining the battery compartment after the power supply plug is rotated into the storage position, and the protrusion is embedded and engaged into the recess.

* * * * *